United States Patent [19]
Henriksen

[11] Patent Number: 5,827,025
[45] Date of Patent: Oct. 27, 1998

[54] LUG NUT DISC SPRING ASSEMBLY

[75] Inventor: Arne Henriksen, Hawthorn Woods, Ill.

[73] Assignee: Seventy-Five and Associates, Ltd., Schaumburg, Ill.

[21] Appl. No.: 986,425

[22] Filed: Dec. 8, 1997

[51] Int. Cl.$^6$ .................... F16B 3/02; F16B 43/00
[52] U.S. Cl. ................ 411/11; 411/533; 411/544; 411/917
[58] Field of Search .................. 411/10, 11, 432, 411/533, 544, 917, 534

[56] References Cited

U.S. PATENT DOCUMENTS

| | | | |
|---|---|---|---|
| 2,781,687 | 2/1957 | Knocke | 411/11 |
| 5,085,550 | 2/1992 | Kendrick | 411/533 X |

FOREIGN PATENT DOCUMENTS

| | | | |
|---|---|---|---|
| 66794 | 12/1982 | European Pat. Off. | 411/11 |
| 2127122 | 4/1984 | United Kingdom | 411/11 |

*Primary Examiner*—Neill Wilson
*Attorney, Agent, or Firm*—Hill & Simpson

[57] ABSTRACT

A self-tensioning, disc spring assembly is provided. The assembly has a circular disc spring with an outer diameter and an inner diameter defining a center hole. The disc spring has a height greater at the inner diameter than at the outer diameter. The disc spring is also resiliently compressible such that it can be flattened. A zinc element, being zinc or a zinc alloy, is provided in the form of a ring or other shape, or a surface deposit on the disc spring or nut, to prevent rusting of the lug bolt. In addition a method of fastening a rim to a hub is also provided. The method has the steps of: positioning the rim on the hub so that the at least one lug bolt passes through the at least one mounting hole of the rim; providing a tensioning disc spring assembly on the at least one lug bolt; screwing a nut onto the at least one lug bolt to a preselected torque so that the disc spring flattens when a preselected torque amount is achieved.

23 Claims, 2 Drawing Sheets

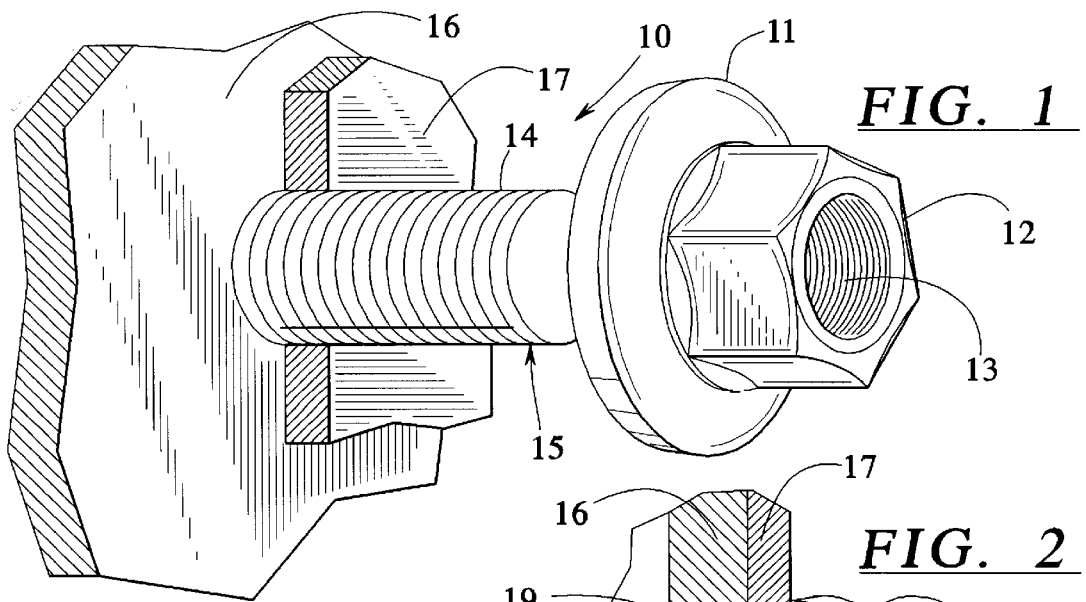
FIG. 1
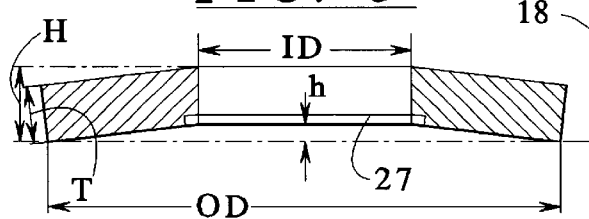
FIG. 5
FIG. 2
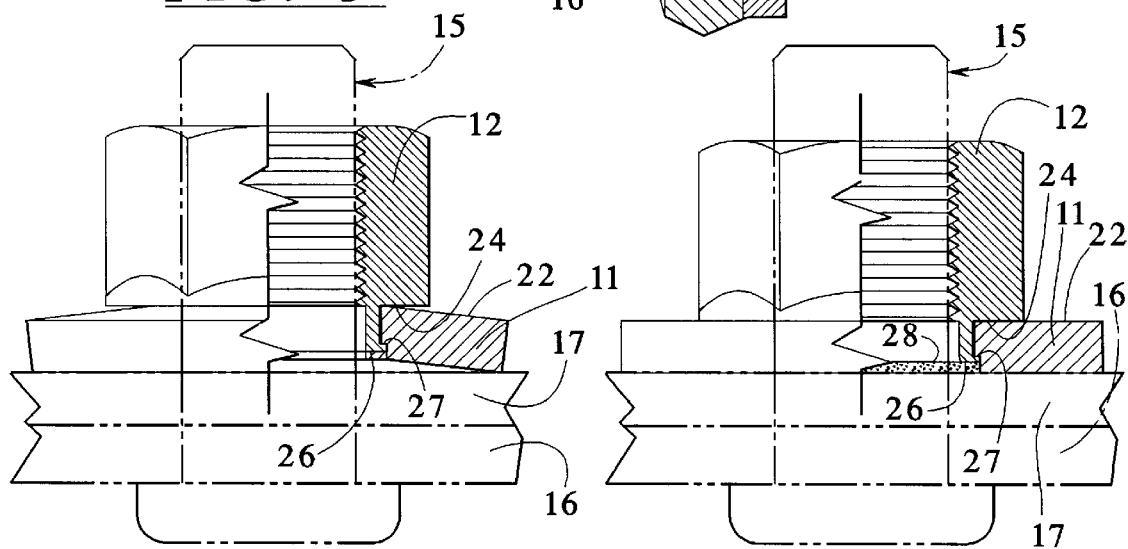
FIG. 3
FIG. 4

LUG NUT DISC SPRING ASSEMBLY

BACKGROUND OF THE INVENTION

1. Field of the Invention

The present invention is directed generally to fasteners and more particularly to a disc spring assembly that remains tight and avoids rust deterioration during adverse conditions encountered when used on the wheels of semi-tractor trailers and other vehicles.

2. Description of the Related Art

A common problem encountered by over-the-road (OTR) tractor trailers is the loosening of the lug nuts on the wheels of the trailer and the tractor. The trucker must regularly check the lug nuts for tightness during periodic stops. Another common problem is the rusting of the lug bolts, an occurrence that oftentimes cannot be observed without removal of the lug nuts from the lug bolts.

FIG. 6 shows a conventional double wheel arrangement for a truck. A first wheel or rim 100 is clamped to a second wheel 102, a wheel hub 104 and a brake drum 106, by a plurality of lug bolts 110 and nuts 112.

Several serious and dangerous problems can occur when a lug nut has loosened on the truck or the trailer. A common problem results from the currently practiced methods used to secure nuts to lug bolts on new truck and trailer wheels. For example, a new truck rim will usually have several coats of paint. The nuts are tightened down on the rim to usually 500 foot-pounds which compresses the paint on the rim. The subsequently compressed layers of paint on the rim can create a gap between the nut and the rim to enable the initially tight nuts to loosen up. Along with four coats of paint, the two wheels 100, 102 which are approximately ¼" thick, the brake drum 106 which is approximately ½" thick, and the wheel hub 104 which is approximately ½" thick, together result in an additive thickness of the four stacked parts of about 1½ inches. An initial torque of 500 ft.-lbs. can allow the material of the stacked parts to relax allowing the nut to loosen.

When the nuts loosen, the wheel is able to rock and wobble back and forth on the lug bolts. After a period of use in which the vibration is accentuated, the lug hole in the wheel actually opens up and damages the wheel. A serious problem can occur when this happens to the lug nuts and the wheel. For example, in an emergency or panic stop, the driver can shear off all the lug bolts, and the wheels will come off, thus rendering the trailer or vehicle uncontrollable and very dangerous. Also, the wheel becomes a dangerous projectile, capable of seriously injuring others. The rusting of the lug bolt can also weaken the lug bolt, thus causing it to be more susceptible to shearing, even without the nuts being loose.

A need therefore exists for a self tensioning lug nut disc spring assembly that keeps the nut tight on the rim and an arrangement to prevent or reduce rust deterioration. This need is especially great since approximately 20 to 30 million of the lug nuts having the above-indicated problems and should be replaced. Also, every year approximately 5 million additional lug nuts are put on truck trailer rims that continue to present the stated serious problems.

SUMMARY OF THE INVENTION

To this end, the present invention provides a self-tensioning disc spring assembly having a pre-stressed, angled disc spring that deflects flat position when the prescribed torque is applied to a nut with which it is used. The nut/disc spring assembly may also be provided with a zinc insert which prevents or reduces any rusting of the lug bolts which might otherwise occur. The self-tensioning disc spring assembly of the present invention provides several advantages.

An advantage of the present invention is to provide a self-tensioning assembly that provides a tightening nut and a pre-stressed, cupped disc spring connected together in an easy-to-use assembly. The disc spring is cupped so that when the nut is tightened to the proper torque onto a lug bolt of a wheel, the pre-stressed, cupped disc spring flattens between the wheel and the nut.

An advantage of the present invention is to provide a self tensioning nut and disc spring assembly having a pre-stressed, non-flat disc spring which deforms at a prescribed and preselected torque on the lug nut with which is used.

An advantage of the present invention is to provide a pre-stressed metal disc spring assembly that keeps lug nut pressure on the wheel as the lug nut starts to loosen and takes up slack that occurs between the nut and the rim.

An advantage of the present invention is to provide a self-tensioning disc spring assembly that is safe and convenient to use for a trucker and manufacturer.

An advantage of the present invention is to provide a self tensioning disc spring assembly that resists loosening by attempting to spring back to its original shape prior to the flattening deformation caused by tightening the nut onto the hub.

An advantage of the present invention is to provide a self-tensioning disc spring assembly having a simple construction and design.

Another advantage of the present invention is to provide a self-tensioning disc spring assembly wherein the disc spring has a contrasting color to the tightening nut by painting or plating the disc spring so as to identify that new replacement nut has been used.

A further advantage of the present invention is to provide a self-tensioning and disc spring assembly as a single piece so that the user does not have to verify that he has a nut and a disc spring, since the two are connected. This also has the additional benefit of ensuring that the disc spring is oriented in the correct position when mounted onto the lug bolt and not in an inverted condition. This will guarantee proper operation of the assembly.

BRIEF DESCRIPTION OF THE DRAWINGS

FIG. 1 a perspective view of an embodiment of the disc spring assembly of the preset invention in a partial cross-section in an environment of use.

FIG. 2 is a rear perspective view of an embodiment of the disc spring assembly of FIG. 1 in partial cross-section.

FIG. 3 is a side elevational view of an embodiment of the disc spring assembly of the present invention in partial cross-section in an untightened condition.

FIG. 4 is a side elevational view of an embodiment of the disc spring assembly of the present invention in a partial cross-section in a tightened condition.

FIG. 5 is a side elevational view of an embodiment of the disc spring itself of the assembly present invention illustrating relative dimensions thereof.

DETAILED DESCRIPTION OF THE PREFERRED EMBODIMENTS

Figure 6:
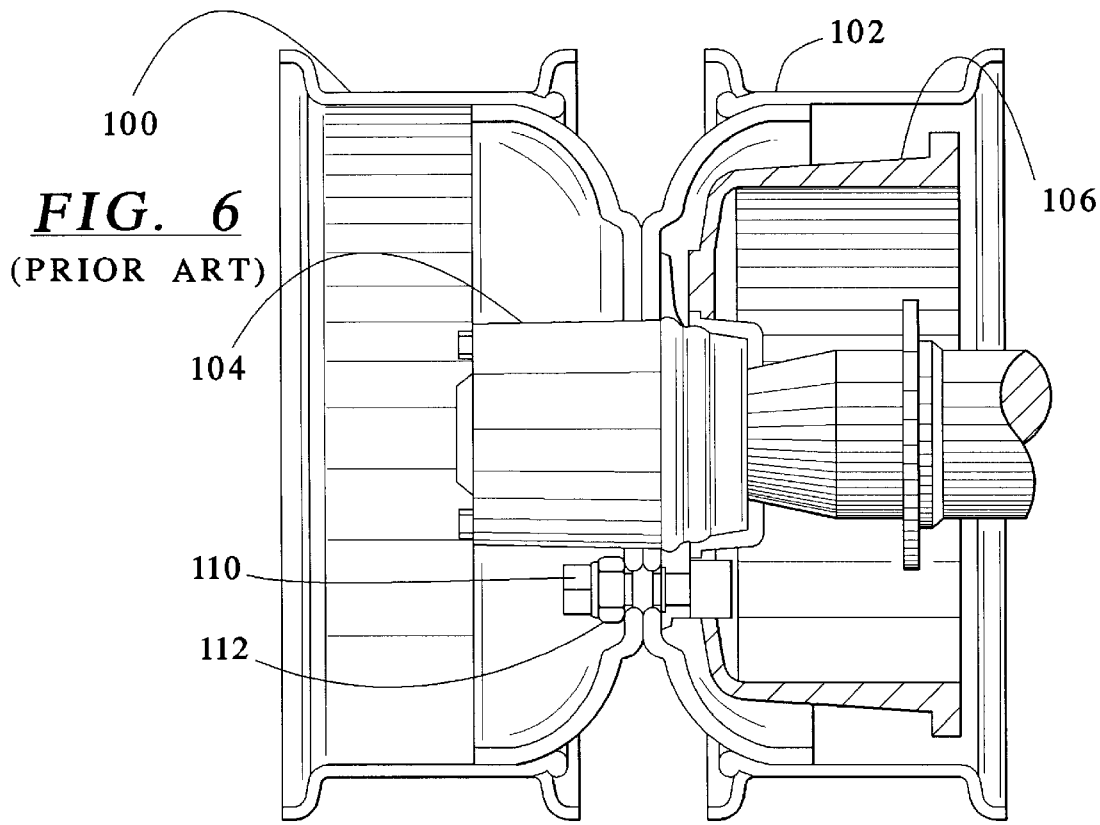
FIG. 6 is a partial sectional view of a prior art wheel arrangement for a truck.

The present invention provides a self-tensioning, fastener assembly that flattens to approximately 100% of the distance between its undeflected state and being completely flat, when tightened by a nut onto a lug bolt when the nut is tightened to the proper preselected torque. FIGS. 1–4 illustrate the disc spring assembly in a simplified environment showing a single wheel mounted to a wheel hub, but the disc spring is also applicable to be utilized in a dual wheel truck wheel environment, such as shown in FIG. 6.

Referring specifically to the drawings, FIGS. 1 and 2 show perspective views of an embodiment of the self-tightening, disc spring assembly indicated generally at 10. The assembly 10 includes an angled disc spring 11 and a lug nut 12. The lug nut 12 has internal threads 13 that mate to threads 14 of a lug bolt 15. The lug bolt 15 is mounted to a wheel hub 16, for example, and penetrates a wheel or rim 17. The lug bolt 15 also has a head 18 or another nut, located behind the wheel hub 16 to hold the lug bolt 15 in the wheel hub 16. The lug bolt 15 may also include longitudinal ribs 19 or other means to prevent rotation of the lug bolt 15. The ribs 19 or other means aid in preventing rotation of the lug bolt 15 when the nut 12 is tightened. The disc spring 11 has a central hole 20 that fits around the lug bolt 15.

FIGS. 3 and 4 illustrate the operation of the disc spring assembly 10 of the present invention. Both figures illustrate a side elevational view in partial cross-section of the lug bolt 15, the lug nut 12, the disc spring 11 and the wheel hub 16 and the wheel 17. Referring now to FIG. 3, the nut 12 is shown partially threaded onto the threads 14 of the lug bolt 15. The disc spring 11 is captured between the lug nut 12 and the wheel hub 16. As illustrated, the disc spring 11 has an angled top face 22 which is in contact with a flattening surface 24 of the lug nut 12. The condition illustrated in FIG. 3 shows the disc spring 11 in an uncompressed condition. Turning now to FIG. 4, the disc spring 11 is shown in a compressed condition. The flattening surface 24 impinges upon the angled top face 22 and flattens the disc spring 11 when the proper torque is reached by the nut 12 onto the lug bolt 15.

In addition, FIGS. 3 and 4 illustrate that the disc spring 11 is held to the nut 12 by a flange 26 recessed into an annular step 27. The flange 26 allows the disc spring 11 to rotate with respect to the nut 12. When the nut 12 reaches the proper torque, the disc spring 11 will be flattened by a distance approximately 100% (FIG. 4).

Also illustrated is a zinc or zinc alloy insert 28 which may be in the form of a n annular ring positioned in a recess on one side of the disc spring 11 adjacent to the threads 14 of the lug bolt 15. Alternatively, the zinc or zinc alloy may be deposited on the inside of the nut 12, on the threads thereof or may be deposited on a surface of the disc spring 11.

Although the exact mechanism is not understood, the zinc or zinc alloy prevents rust from developing on ferrous materials closely adjacent to the zinc, and, instead, the zinc itself is consumed or deteriorates before the ferrous material of the lug bolt 15 begins to rust. Thus, the zinc or zinc alloy must be placed within a few inches of the items to be protected, that is, the lug bolt 15. If the zinc insert is in the form of a ring, as illustrated, a new ring can be used once an existing ring has deteriorated. Alternatively, if the zinc is applied as a deposit on the nuts 12 or disc springs 11, those will have to be replaced or recoated as the zinc is consumed.

FIG. 5 illustrates the angled disc spring 11 of the present invention. Due to the angle of the disc spring 11, which can result from the disc spring being pre-stressed or fabricated of a resilient material in a shape such as that showing in FIG. 3, the angled disc spring 11 has a height H and a crown height h. The crown height h is the maximum clearance between the disc spring 11 and the wheel 17. The angled disc spring 11 also has an inner-diameter ID and an outer diameter OD. Further, the angled disc spring 11 has a thickness T.

In an exemplary embodiment of the present invention, the disc spring 11 has the following representative measurements. The disc spring 11 has an outer diameter OD of approximately 2.205 inches. A thickness T of the disc spring 11 is approximately 0.236 inches and overall height H ("stack height") of the disc spring 11 is 0.310 inches. When the disc spring is torqued to 500 ft. lbs., 44,000 pounds force load is applied to the wheel. The crown height h will change from about 0.074 inches to about 0.0 inches.

Figure 7:
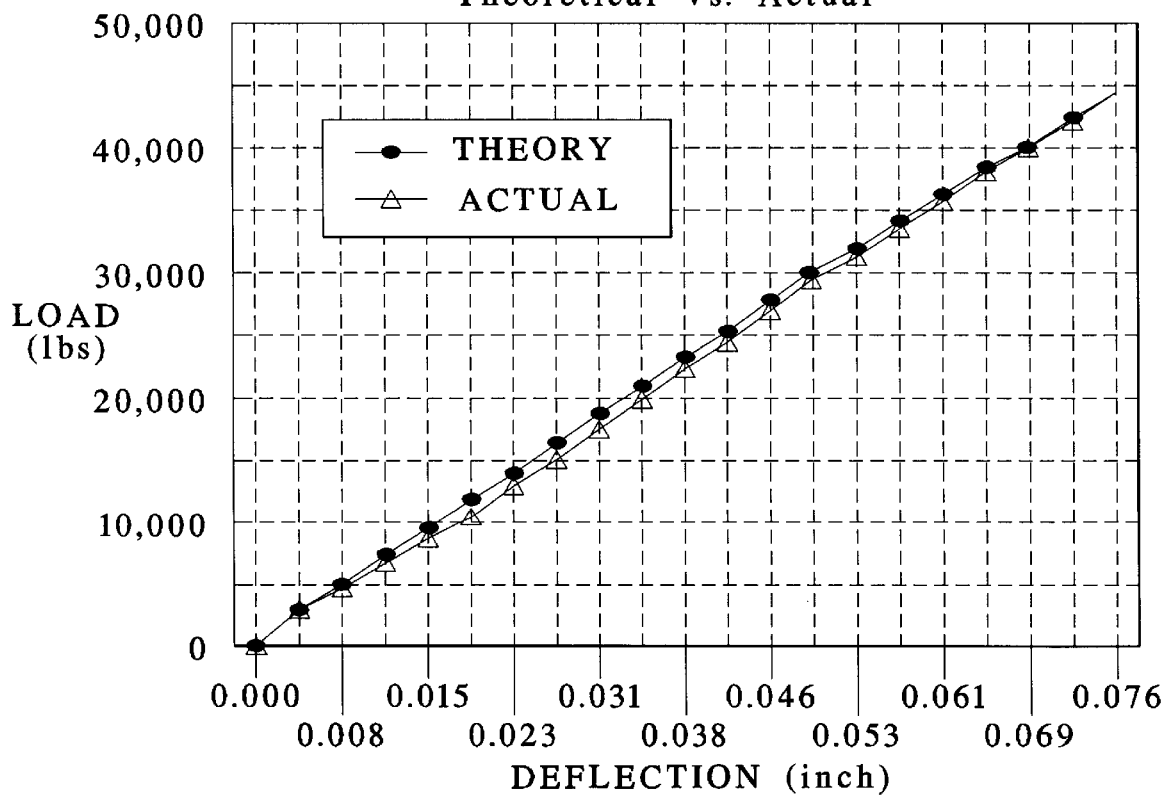
FIG. 7 is a graphical representation of the relationship between load on the disc spring and disc spring deflection.

As demonstrated by Table 1 below and FIG. 7, the disc spring 11 as dimensionally described above maintains high loads even when the deflection is slightly decreased due to compressed paint or part relaxation. Deflection $\Delta H$ is the change in disc spring stack height H. When tightened to 500 ft.-lbs., 44,000 lbs. of actual force (load) is applied to the wheel 17 at that point. If the nut or material relaxes by 0.014 inches, the force will still be 44,000 lbs. With a conventional nut, in comparison, the applied force given a 0.014 inch relaxation would decrease to zero. In fact, given a relaxation of 0.001 inch the applied force would decrease to zero.

TABLE 1

| Defl" | Bolt Stretch |
| --- | --- |
| 0.0000 | 0 |
| 0.0004 | 2,700 |
| 0.0008 | 4,300 |
| 0.0011 | 6,800 |
| 0.0015 | 8,400 |
| 0.0019 | 10,300 |
| 0.0023 | 13,000 |
| 0.0027 | 15,200 |
| 0.0031 | 17,500 |
| 0.0034 | 19,800 |
| 0.0038 | 21,800 |
| 0.0042 | 24,000 |
| 0.0046 | 26,500 |
| 0.0050 | 28,800 |
| 0.0053 | 31,000 |
| 0.0057 | 33,000 |
| 0.0061 | 35,200 |
| 0.0065 | 37,600 |
| 0.0069 | 40,000 |
| 0.0073 | 42,000 |
| 0.0076 | 44,000 |

Also, the increased bearing surface of the disc spring 11, against the wheel 17 more effectively spreads the load against the wheel 17, compared to the more concentrated initial loads of conventional lug nuts.

Exemplary material type for the disc spring 11 is 6150 chrome vanadium. A disc spring 11 of 6150 chrome vanadium would provide the resiliency necessary for the disc spring of the present invention. Also, heat-treated metal such as steel can be used for the disc spring. In addition, the disc spring 11 may be pre-stressed metal. One skilled in the art will recognize the material used for the disc spring 11 is advantageously a resilient metal such that it provides the self-tensioning features described above. In addition, the disc spring 11 may be plated using chrome or other plating material. In an embodiment, the disc spring 11 may also be painted a fluorescent or easily visible color. Also, the plating may have a color. The color enables the user to quickly see if the disc spring assembly 10 of the present invention is being used and whether the proper torque has bee provided.

Although modifications and changes may be suggested by those skilled in the art, it is the intention of the inventor to embody within the patent warranted hereon all changes and modifications as reasonably and properly come within the scope of his contribution to the art.

I claim as my invention:

1. A self-tensioning, disc spring assembly comprising:
   a non-flat circular disc spring having an outer diameter, and an inner diameter defining a center hole, the center hole accommodating an annular insert, the annular insert comprising zinc, wherein the disc spring has a height greater at the inner diameter than at the outer diameter and wherein the ring is resiliently compressible such that it can be flattened when compressed by a nut tightened to a preselected torque and returned to its original shape after use.

2. The disc spring of claim 1, wherein the disc spring is heat-treated steel.

3. The disc spring of claim 1, wherein the disc spring is 6150 chrome vanadium.

4. The disc spring of claim 1, wherein the disc spring is pre-stressed metal.

5. In a combination of a disc spring located on a bolt and secured by a nut, the disc spring to be compressed against a plate, the improvement comprising:
   the disc spring being constructed having an angled shape in cross-section providing said disc spring with a crown height measured between the plate and a point of largest clearance between the plate and the disc spring, such that when the nut is tightened onto the bolt to a preselected torque amount, the angled disc spring flattens,
   the disc spring further having an inner diameter defining a center hole, the center accommodating an annular insert for engaging the bolt, the annular insert comprising zinc.

6. The improvement of claim 5, wherein the disc spring is 6150 chrome vanadium.

7. The improvement of claim 5, wherein the disc spring is a resilient material.

8. The improvement of claim 7 wherein the said annular insert comprises a zinc alloy.

9. A method of fastening a rim having at least one mounting hole to a hub having at least one lug bolt, the method comprising the steps of:
   positioning the rim on the hub so that the at least one lug bolt passes through the at least one mounting hole of the rim;
   providing a tensioning, torque-indicating disc spring assembly including an angled disc spring having a crown height measured between the rim and the point of maximum clearance between the disc spring and the rim, connected by a lug nut on the at least one lug bolt, the disc spring further having an inner diameter defining a center hole, the center accommodating an annular insert for engaging the bolt, the annular insert comprising zinc; and
   screwing the lug nut onto the at least one lug bolt to a preselected torque so that the angled disc spring flattens.

10. The method of claim 9, wherein the annular insert comprises a zinc alloy.

11. A self-tightening disc spring assembly, comprising:
   a nut portion;
   a disc spring portion having an inner diameter and an outer diameter such that inner diameter is at a different height than the outer diameter to form an angled disc spring, the disc spring further having an inner diameter defining a center hole, the center accommodating an annular insert for engaging the bolt, the annular insert comprising zinc; and
   means for connecting the non-flat disc spring to the nut portion so that the disc spring can freely rotate relative to the nut portion.

12. The disc spring assembly of claim 11, wherein the non-flat disc spring has a color contrasting with that of the nut portion.

13. The disc spring assembly of claim 11, wherein the non-flat disc spring is hardened steel.

14. The disc spring assembly of claim 11, wherein the non-flat disc spring is 6150 chrome vanadium.

15. The disc spring assembly of claim 11, wherein the non-flat disc spring is pre-stressed.

16. The disc spring assembly of claim 11, wherein said annular insert comprises a zinc alloy.

17. A self-tensioning, disc spring assembly comprising:
   a non-flat circular disc spring having an outer diameter, and an inner diameter defining a center hole, the inner diameter of the disc spring being coated with a material comprising zinc, wherein the disc spring has a height greater at the inner diameter than at the outer diameter and wherein the ring is resiliently compressible such that it can be flattened when compressed by a nut tightened to a preselected torque and returned to its original shape after use.

18. In a combination of a disc spring located on a bolt and secured by a nut, the disc spring to be compressed against a plate, the improvement comprising:
   the disc spring being constructed having an angled shape in cross-section providing said disc spring with a crown height measured between the plate and a point of largest clearance between the plate and the disc spring, such that when the nut is tightened onto the bolt to a preselected torque amount, the angled disc spring flattens, the disc spring further having an inner diameter that defines a center hole, the inner diameter of the disc spring being coated with a material comprising zinc.

19. A method of fastening a rim having at least one mounting hole to a hub having at least one lug bolt, the method comprising the steps of:
   positioning the rim on the hub so that the at least one lug bolt passes through the at least one mounting hole of the rim;
   providing a tensioning, torque-indicating disc spring assembly including an angled disc spring having a crown height measured between the rim and the point of maximum clearance between the disc spring and the rim, connected by a lug nut on the at least one lug bolt, the disc spring further having an inner diameter that defines a center hole, the inner diameter of the disc spring being coated with a material comprising zinc; and
   screwing the lug nut onto the at least one lug bolt to a preselected torque so that the angled disc spring flattens.

20. A self-tightening disc spring assembly, comprising:
   a nut portion;
   a disc spring portion having an inner diameter and an outer diameter such that inner diameter is at a different height than the outer diameter to form an angled disc spring, the disc spring further having an inner diameter that defines a center hole, the inner diameter of the disc spring being coated with a material comprising zinc; and means for connecting the non-flat disc spring to the nut portion so that the disc spring can freely rotate relative to the nut portion.

21. In a combination of a disc spring located on a bolt and secured by a nut, the disc spring to be compressed against a plate, the improvement comprising:

the disc spring being constructed having an angled shape in cross-section providing said disc spring with a crown height measured between the plate and a point of largest clearance between the plate and the disc spring, such that when the nut is tightened onto the bolt to a preselected torque amount, the angled disc spring flattens, the nut comprising an inner diameter that defines a threaded hole, the threaded hole of the nut being coated with a material comprising zinc.

22. A method of fastening a rim having at least one mounting hole to a hub having at least one lug bolt, the method comprising the steps of:

positioning the rim on the hub so that the at least one lug bolt passes through the at least one mounting hole of the rim;

providing a tensioning, torque-indicating disc spring assembly including an angled disc spring having a crown height measured between the rim and the point of maximum clearance between the disc spring and the rim, connected by a lug nut on the at least one lug bolt, the nut comprising an inner diameter that defines a threaded hole, the threaded hole of the nut being coated with a material comprising zinc; and screwing the lug nut onto the at least one lug bolt to a preselected torque so that the angled disc spring flattens.

23. A self-tightening disc spring assembly, comprising:

a nut portion;

a disc spring portion having an inner diameter and an outer diameter such that inner diameter is at a different height than the outer diameter to form an angled disc spring, the nut comprising an inner diameter that defines a threaded hole, the threaded hole of the nut being coated with a material comprising zinc; and means for connecting the non-flat disc spring to the nut portion so that the disc spring can freely rotate relative to the nut portion.

* * * * *